(12) United States Patent
Matsumoto

(10) Patent No.: US 10,240,738 B2
(45) Date of Patent: Mar. 26, 2019

(54) VEHICLE LED BULB

(71) Applicant: IPF Corporation, Takasaki-shi, Gunma (JP)

(72) Inventor: Rio Matsumoto, Takasaki (JP)

(73) Assignee: IPF Corporation, Takasaki-shi, Gunma (JP)

( * ) Notice: Subject to any disclaimer, the term of this patent is extended or adjusted under 35 U.S.C. 154(b) by 0 days.

(21) Appl. No.: 15/916,282

(22) Filed: Mar. 9, 2018

(65) Prior Publication Data

US 2018/0306397 A1 Oct. 25, 2018

(30) Foreign Application Priority Data

Apr. 25, 2017 (JP) .................................. 2017-86423

(51) Int. Cl.
| | |
|---|---|
| *B60Q 1/20* | (2006.01) |
| *F21S 41/125* | (2018.01) |
| *F21S 41/141* | (2018.01) |
| *F21W 102/13* | (2018.01) |
| *F21Y 115/10* | (2016.01) |
| *F21W 102/30* | (2018.01) |

(52) U.S. Cl.
CPC .............. *F21S 41/125* (2018.01); *B60Q 1/20* (2013.01); *F21S 41/141* (2018.01); *F21W 2102/13* (2018.01); *F21W 2102/30* (2018.01); *F21Y 2115/10* (2016.08)

(58) Field of Classification Search
CPC . B60Q 1/0041; B60Q 1/2696; B60Q 2400/20
USPC .................................................. 362/459–549
See application file for complete search history.

(56) References Cited

FOREIGN PATENT DOCUMENTS

JP 2016-119282 A 6/2016

OTHER PUBLICATIONS

Japanese decision to Grant a Patent dated Jun. 5, 2017.

*Primary Examiner* — William J Carter
(74) *Attorney, Agent, or Firm* — Yokoi & Co., U.S.A.; Toshiyuki Yokoi

(57) ABSTRACT

A pair of a white LED light source 25 and a selective yellow LED light source 26 is provided on LED mounting face portions 21 located on both sides of a light source heat conduction portion 23. The selective yellow LED light source is mounted on an upper side of the white LED light source so that the selective yellow LED light source and the white LED light source are substantially in contact with each other in a vertical direction, and the selective yellow LED light source is mounted on a rear side of the white LED light source so that a distance between the selective yellow LED light source and the white LED light source in a front-rear direction is equal to or shorter than the width of the selective yellow LED light source and equal to or shorter than the width of the white LED light source.

4 Claims, 7 Drawing Sheets

A-A line

B-B line

VEHICLE LED BULB

CROSS-REFERENCES TO RELATED APPLICATIONS

This patent specification is based on Japanese patent application, No. 2017-86423 filed on Apr. 25, 2017 in the Japan Patent Office, the entire contents of which are incorporated by reference herein.

BACKGROUND OF THE INVENTION

1. Field of the Invention

The present invention relates to a vehicle LED bulb such as a fog lamp and a driving lamp capable of switching between two colors using an LED light source.

2. Description of Related Art

According to the safety standard in Japan, a front fog lamp of an automobile is regulated to have a light source color of white or selective yellow.

A conventional vehicle fog lamp using an LED as a light source has a pair of LED light sources, which are either white or selective yellow, on both sides of a light source heat conduction portion of an elongated metal having thermal conductivity. Depending on the intended use, a fog lamp having single light source of either one of white or selective yellow is selected and attached. Thus, there has been no fog lamp capable of switching between two colors.

A vehicle head lamp in which two LED light sources are provided on both sides of the light source heat conduction portion is known (Patent Document 1).

As shown in FIGS. 7A, 7B and 7C, in a vehicle LED head lamp 10, an LED mounting face portion 14 is formed on both sides of a light source heat conduction portion 11, and the LED mounting face portions 14 form a triangular shape. Low-beam LEDs 15 are mounted on a front shield 12 side of the LED mounting face portion 14 and high-beam LEDs 16 are mounted on a base portion 18 side of the LED mounting face portion 14 at intervals. A reference numeral 17 denotes a step for the low-beam, and a reference numeral 19 denotes a heat radiation portion.

In the above described configuration, when the high-beam LEDs 16 are turned on, the illuminated range falls within a high-beam illuminated range shown in FIG. 6. On the other hand, when the low-beam LEDs 15 are turned on, the illuminated range falls within a low-beam illuminated range shown in FIG. 6. Therefore, in a light distribution of the above described configuration, the illuminated ranges are greatly different between the high-beam and the low-beam.

[Patent Document 1] Japanese Unexamined Patent Application Publication No. 2016-119282

BRIEF SUMMARY OF THE INVENTION

The head lamp using LED light sources described in the Patent Document 1 is for switching between low-beam and high-beam. However, there is a problem when directly using the head lamp as a vehicle LED bulb such as a fog lamp or a driving lamp capable of switching between two colors since the cutoff lines of the illuminated ranges of the head lamp are greatly different between low-beam and high-beam.

The present invention provides a vehicle LED bulb having two colors of LED light sources of a white LED light source and a selective yellow LED light source, and capable of switching between two colors by a switch on/off operation depending on the purpose.

A vehicle LED bulb according to the present invention includes: a light source heat conduction portion 23; a mounting frame 31; and a heat radiation portion 32, wherein a pair of a white LED light source 25 and a selective yellow LED light source 26 is mounted on each of LED mounting face portions 21 located on both sides of the light source heat conduction portion 23, the selective yellow LED light source 26 is mounted on an upper side of the white LED light source 25 so that the selective yellow LED light source 26 and the white LED light source 25 are substantially in contact with each other in a vertical direction, centers of the selective yellow LED light source 26 and the white LED light source 25 are offset at a distance in a front-rear direction, and the distance of the offset between the selective yellow LED light source 26 and the white LED light source 25 is equal to or shorter than the width of the selective yellow LED light source 26 and equal to or shorter than the width of the white LED light source 25.

The white LED light source 25 is configured to intensively illuminate a roadside strip side to assist a head lamp to illuminate a range where a beam of the head lamp does not reach, and the selective yellow LED light source 26 is configured to intensively illuminate a center side in a right-left direction and a slightly lower side of an illuminated area of the white LED light source 25 to improve visibility in rain or fog.

The LED mounting face portions 21 located on both sides of the light source heat conduction portion 23 may be substantially parallel to the vertical direction. Alternatively, the LED mounting face portions 21 located on both sides of the light source heat conduction portion 23 may be inclined with respect to the vertical direction.

A vehicle LED bulb according to the invention of claim 1 includes: a light source heat conduction portion; a mounting frame; and a heat radiation portion, wherein a pair of a white LED light source and a selective yellow LED light source is mounted on each of LED mounting face portions located on both sides of the light source heat conduction portion, the selective yellow LED light source is mounted on an upper side of the white LED light source so that the selective yellow LED light source and the white LED light source are substantially in contact with each other in a vertical direction, centers of the selective yellow LED light source and the white LED light source are offset at a distance in a front-rear direction, and the distance of the offset between the selective yellow LED light source and the white LED light source is equal to or shorter than the width of the selective yellow LED light source and equal to or shorter than the width of the white LED light source. Therefore, it is possible to minimize the difference in an optical axis (cutoff line position) of the two colors. It is also possible to obtain an optimal light distribution pattern suitable for each color of white and selective yellow.

In addition, one vehicle LED bulb can have the function of switching between two colors by a switch on/off operation.

According to the invention of claim 2, the white LED light source has an effect to assist a head lamp by intensively illuminating a roadside strip side to illuminate a range where a beam of the head lamp does not reach. The selective yellow LED light source has an effect to improve visibility in rain or fog by intensively illuminating a center side in a right-left direction and a slightly lower side of an illuminated area of the white LED light source.

According to the invention of claim 3, the LED mounting face portions located on both sides of the light source heat conduction portion are substantially parallel to the vertical direction. Therefore, an ideal light distribution pattern can be easily created.

Further, effective discharge characteristics can be obtained by a configuration in which the LED mounting face portions located on both sides of the light source heat conduction portion are inclined with respect to the vertical direction.

DETAILED DESCRIPTION OF THE INVENTION

Figure 1:
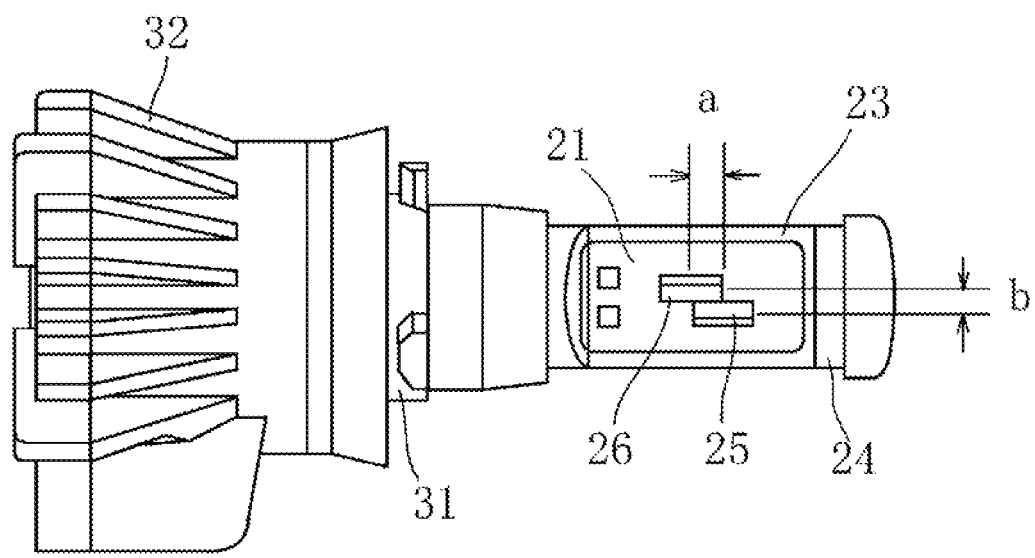
FIG. 1 is a front view showing one embodiment of a vehicle LED bulb according to the present invention.

A vehicle LED bulb according to the present invention includes: a light source heat conduction portion 23; a mounting frame 31; and a heat radiation portion 32, wherein a pair of a white LED light source 25 and a selective yellow LED light source 26 is mounted on each of LED mounting face portions 21 located on both sides of the light source heat conduction portion 23, the selective yellow LED light source 26 is mounted on an upper side of the white LED light source 25 so that the selective yellow LED light source 26 and the white LED light source 25 are substantially in contact with each other in a vertical direction, and the selective yellow LED light source 26 is mounted on a rear side of the white LED light source 25 so that centers of the selective yellow LED light source 26 and the white LED light source 25 are offset at a distance in a front-rear direction, and the distance of the offset between the selective yellow LED light source 26 and the white LED light source 25 is equal to or shorter than the width of the selective yellow LED light source 26 and equal to or shorter than the width of the white LED light source 25.

The white LED light source 25 is configured to intensively illuminate a roadside strip side to assist a head lamp to illuminate a range where a beam of the head lamp does not reach, and the selective yellow LED light source 26 is configured to intensively illuminate a center side in a right-left direction and a slightly lower side of an illuminated area of the white LED light source 25 to improve visibility in rain or fog.

The LED mounting face portions 21 located on both sides of the light source heat conduction portion 23 are not necessarily substantially parallel to the vertical direction. The LED mounting face portions 21 located on both sides of the light source heat conduction portion 23 may be inclined with respect to the vertical direction.

EXAMPLE 1

Hereinafter, as an example 1 of the present invention, an example of a vehicle LED fog lamp will be described with reference to FIGS. 1 to 5.

Figure 2:
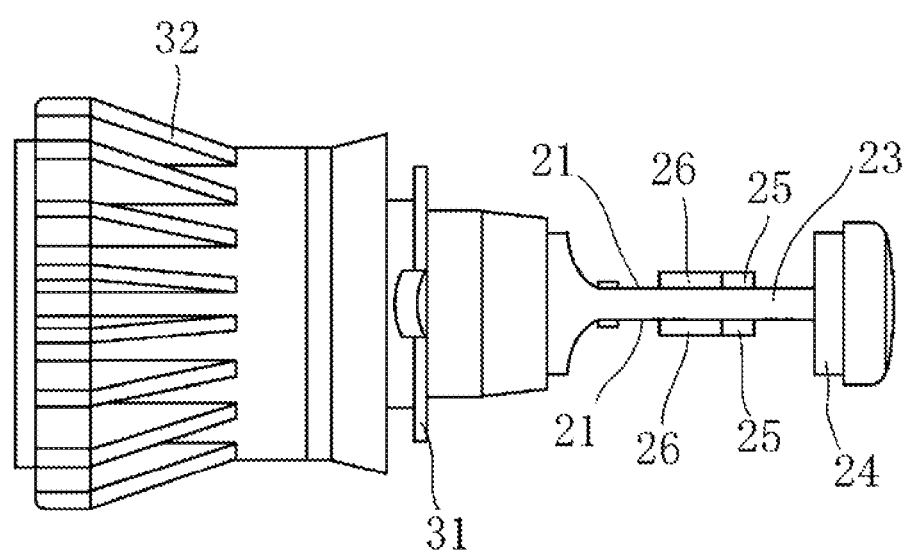
FIG. 2 is a plan view showing one embodiment of the vehicle LED bulb according to the present invention.
Figure 3:
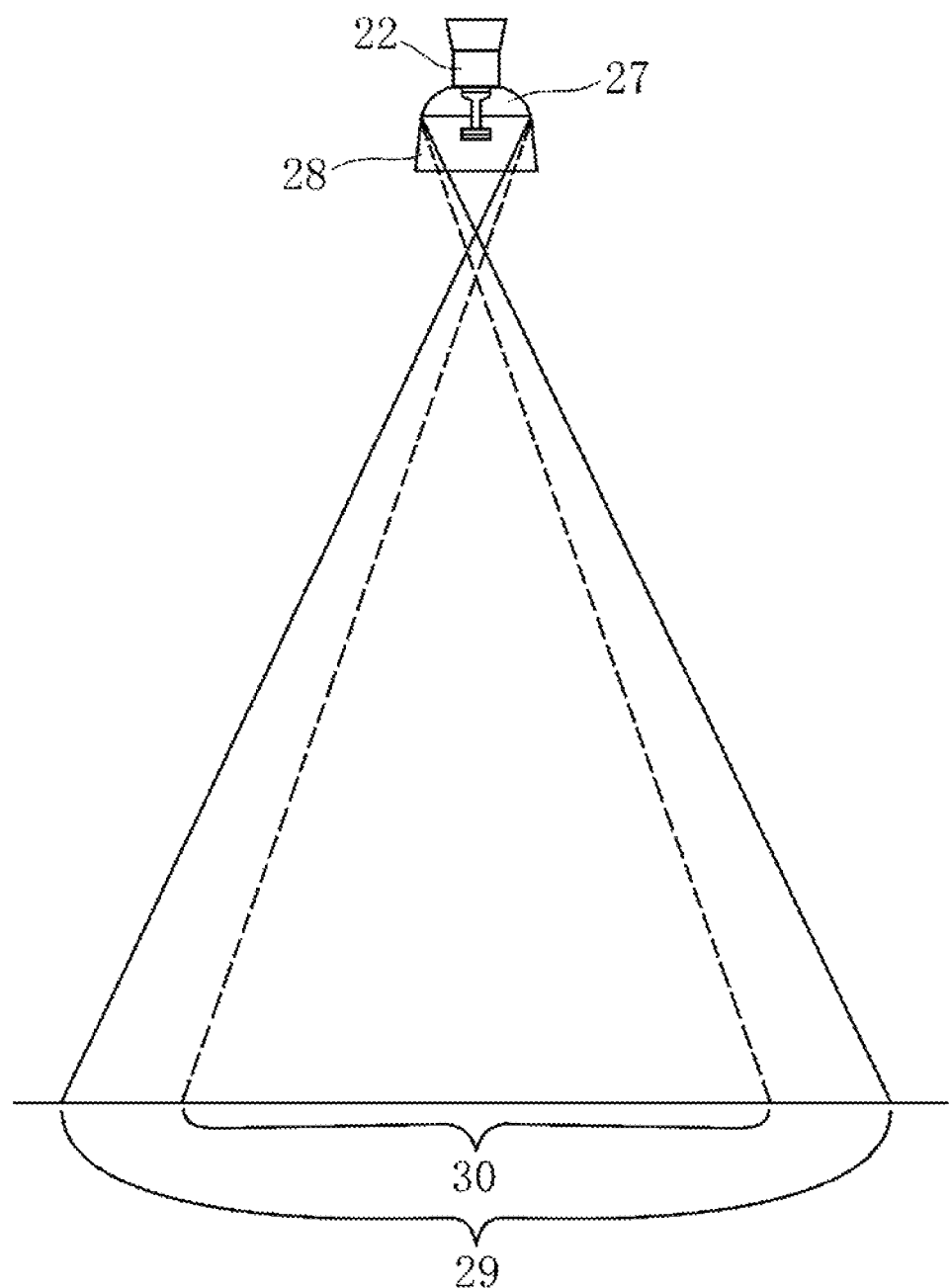
FIG. 3 is a light distribution diagram of the vehicle LED bulb according to the present invention showing an illuminated area of white beam 29 and an illuminated area of selective yellow beam 30 seen from above.
Figure 4:
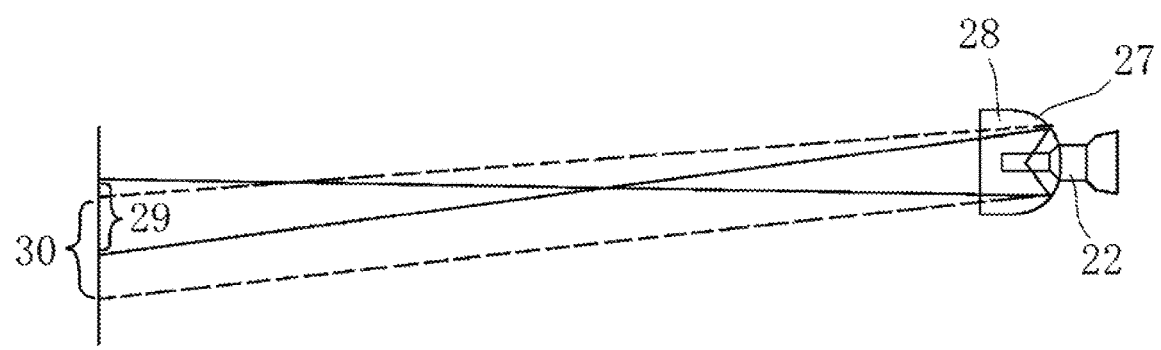
FIG. 4 is a light distribution diagram of the vehicle LED bulb according to the present invention showing the illuminated area of white beam 29 and the illuminated area of selective yellow beam 30 seen from a lateral side.

In FIG. 1 and FIG. 2, a reference numeral 23 denotes a light source heat conduction portion made of metal (e.g., aluminum) or resin having high thermal conductivity. The LED mounting face portions 21 are formed by vertically cutting both sides of the cylindrical body. At the tip portion of the light source heat conduction portion 23, a circular front shield 24 is formed. At the base end portion, a mounting frame 31 is attached to the cylindrical portion. A further base end portion after the mounting frame 31 of the light source heat conduction portion 23 is fitted in a heat radiation portion 32.

A pair of a white LED light source 25 and a selective yellow LED light source 26 is provided substantially at the center of the both sides of the LED mounting face portion 21. In FIG. 1, the white LED light source 25 is located on a bottom side and the selective yellow LED light source 26 is located on an upper side. The white LED light source 25 and the selective yellow LED light source 26 are substantially in contact with each other in a vertical direction so that a vertical distance (b) between the white LED light source 25 and the selective yellow LED light source 26 is as small as possible. Also, centers of the selective yellow LED light source 26 and the white LED light source 25 are offset at a distance (a) in a front-rear direction so that the white LED light source 25 is located on a front side and the selective yellow LED light source 26 is located on a rear side to be overlapped with each other in the front-rear direction. Thus, light distribution diagrams described later can be obtained.

Figure 5:
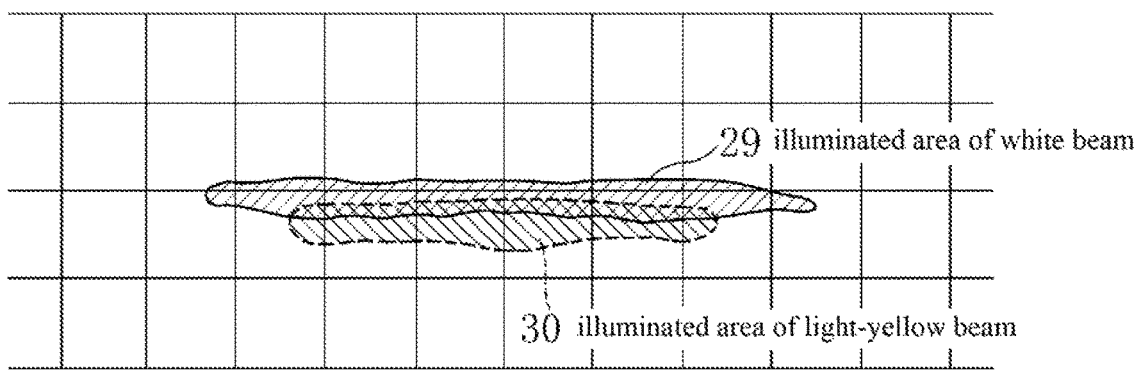
FIG. 5 is a light distribution diagram of the vehicle LED bulb according to the present invention showing the illuminated area of white beam 29 and the illuminated area of selective yellow beam 30.
Figure 6:
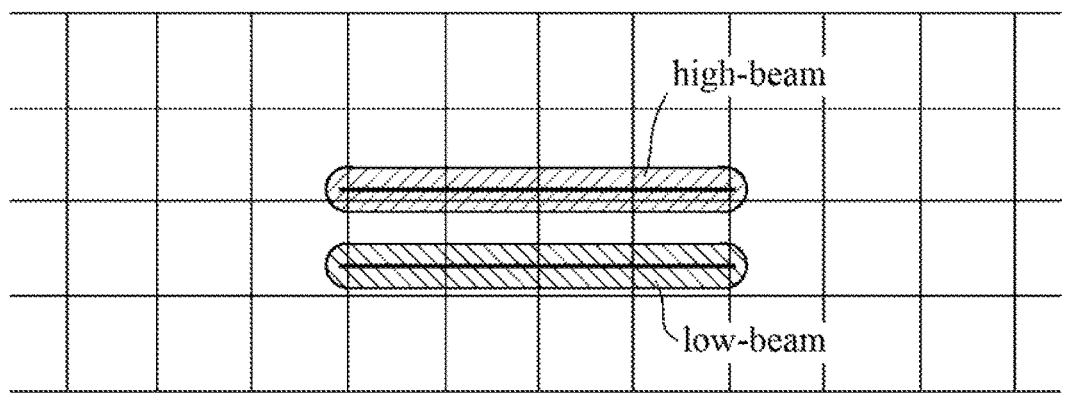
FIG. 6 is a light distribution diagram of a conventional vehicle LED head lamp 10 showing the illuminated area of high-beam and the illuminated area of low-beam.
Figure 7A:
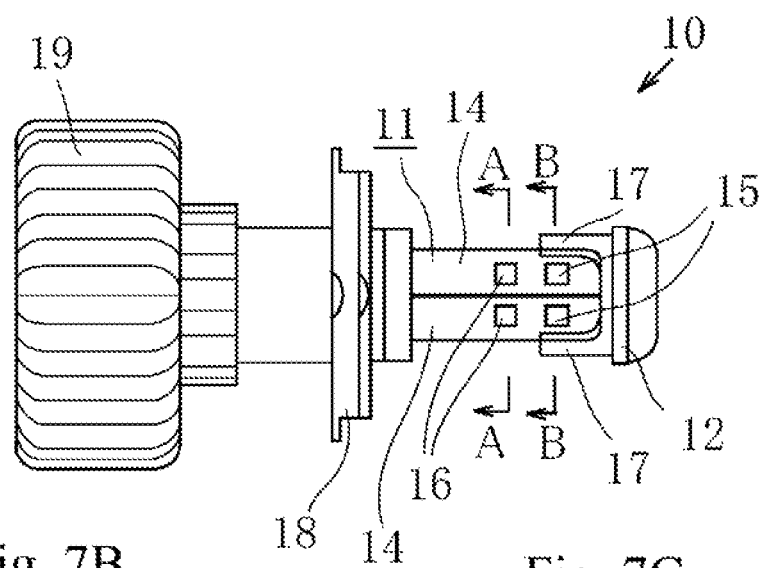
FIG. 7A is a plan view of a conventional vehicle LED head lamp 10.
Figure 7B:
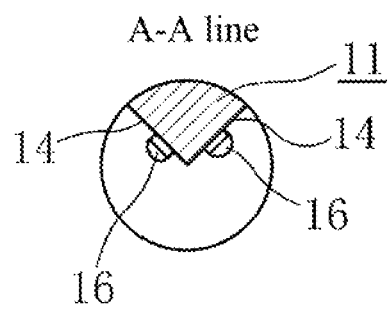
FIG. 7B is a cross-sectional view taken along line A-A in FIG. 7A.
Figure 7C:
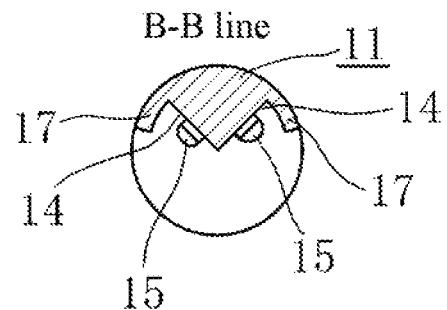
FIG. 7C is a cross sectional view taken along line B-B in FIG. 7A.

Specifically, in general, a head lamp is configured to mainly illuminate a central part of the light distribution diagram so that the beam reaches far. The white LED light source 25 of the fog lamp is mainly used as an auxiliary light of the head lamp. It is preferable that the light distribution diagram of the white LED light source 25 is as shown in FIG. 5 in which the white LED light source 25 mainly illuminates a roadside strip side to assist a range where the light of the head lamp does not reach. Therefore, the mounting position of the white LED light source 25 is lower side of the selective yellow LED light source 26 and slightly front side of the selective yellow LED light source 26 within a range equal to or shorter than the width of the LED light source.

The selective yellow LED light source 26 of the fog lamp is mainly used in the stormy weather of rain and fog. It is preferable that the light distribution diagram of the selective yellow LED light source 26 is as shown in FIG. 5 in which the selective yellow LED light source 26 intensively illuminates a center side in a right-left direction and a slightly lower side of an illuminated area of the white LED light source 25 to improve visibility in rain or fog. Therefore, the mounting position of the selective yellow LED light source 26 is upper side of the white LED light source 25 and slightly rear side of the white LED light source 25 so that the distance (a) of the offset is equal to or shorter than the width of the white LED light source 25 and equal to or shorter than the selective yellow LED light source 26. The distance (a) of the offset is measured between the center of the white LED light source 25 and the center of the selective yellow LED light source 26, or measured between the front end of the white LED light source 25 and the front end of the selective yellow LED light source 26, for example.

In the example shown in Patent Document 1, in order to clearly differentiate the cutoff lines of low-beam and high-beam, a predetermined interval is provided between the vertical mounting positions of the low-beam LED 15 and the high-beam LED 16. However, as shown in FIG. 1, the white LED light source 25 and the selective yellow LED light source 26 used as a fog lamp are mounted substantially in close contact with each other so that the vertical distance (b) becomes as small as possible. This configuration allows to obtain the light distribution diagram in which both illumination areas are substantially overlapped, but the selective yellow LED light source 26 illuminates slightly lower side.

It is desirable to determine the positional relation of the white LED light source 25 and the selective yellow LED light source 26 so that the above-described object can be achieved by examining the light distribution diagram, since the light distribution characteristic differs depending on the shape of a reflector.

In the above described configuration, when the vehicle LED fog lamp 22 of the present invention is set on a lamp housing 28 and the light is emitted, the beam of the white LED light source 25 is reflected by a reflector 27. As a result, the beam of the white LED light source 25 becomes wide in a right-left direction as shown by a solid line in FIG. 3 and approximately horizontal as shown by a solid line in FIG. 4. As a whole, the beam of the white LED light source 25 forms an illuminated area of white beam 29 extending substantially to the roadside strip side as shown by a solid line in FIG. 5.

When a switch (not shown) is switched to the selective yellow LED light source 26 and the light is emitted, the beam of the selective yellow LED light source 26 is reflected by the reflector 27. As a result, the beam of the selective yellow LED light source 26 becomes slightly narrower than the illuminated area of white beam 29 in the right-left direction as shown by a dotted line in FIG. 3. Also, the beam of the selective yellow LED light source 26 illuminates slightly lower side of the illuminated area of white beam 29 in a vertical direction as shown by a dotted line in FIG. 4. As a whole, the beam of the selective yellow LED light source 26 forms an illuminated area of selective yellow beam 30 in which the beam of the selective yellow LED light source 26 intensively illuminate slightly lower side of the illuminated area of white beam 29 as shown by a dotted line in FIG. 5.

In the above embodiment, both surfaces of the light source heat conduction portion 23 have the LED mounting face portions 21 which are substantially parallel to the vertical direction. However, the present invention is not limited to this configuration. The LED mounting face portions 21 may be inclined with respect to the vertical direction. It is preferable that the light source heat conduction portion 23 has a thickness that can sufficiently radiate heat transmitted from the white LED light source 25 and the selective yellow LED light source 26 since the action of heat transfer becomes small when the thickness is too thin.

In the above embodiment, the automotive LED fog lamp is used as an example of the vehicle LED bulb for explanation, but the vehicle LED bulb also includes a vehicle LED bulb capable of switching between two colors such as a driving lamp.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A vehicle LED bulb, comprising:
a light source heat conduction portion;
a mounting frame; and
a heat radiation portion, wherein
a pair of a white LED light source and a selective yellow LED light source is mounted on each of LED mounting face portions located on both sides of the light source heat conduction portion,
the selective yellow LED light source is mounted on an upper side of the white LED light source so that the selective yellow LED light source and the white LED light source are substantially in contact with each other in a vertical direction,
centers of the selective yellow LED light source and the white LED light source are offset at a distance in a front-rear direction, and
the distance of the offset between the selective yellow LED light source and the white LED light source is equal to or shorter than the width of the selective yellow LED light source and equal to or shorter than the width of the white LED light source.

2. The vehicle LED bulb according to claim 1, wherein the white LED light source is configured to intensively illuminate a roadside strip side to assist a head lamp, and
the selective yellow LED light source is configured to intensively illuminate a center side in a right-left direction and a slightly lower side of an illuminated area of the white LED light source to assist the head lamp to illuminate a range where a beam of the head lamp does not reach in rain or fog.

3. The vehicle LED bulb according to claim 1, wherein the LED mounting face portions located on both sides of the light source heat conduction portion are substantially parallel to the vertical direction.

4. The vehicle LED bulb according to claim 1, wherein the LED mounting face portions located on both sides of the light source heat conduction portion are inclined with respect to the vertical direction.

* * * * *